Aug. 6, 1957 J. D. STAGGS 2,802,164
BATTERY-CHARGING APPARATUS
Filed June 28, 1954
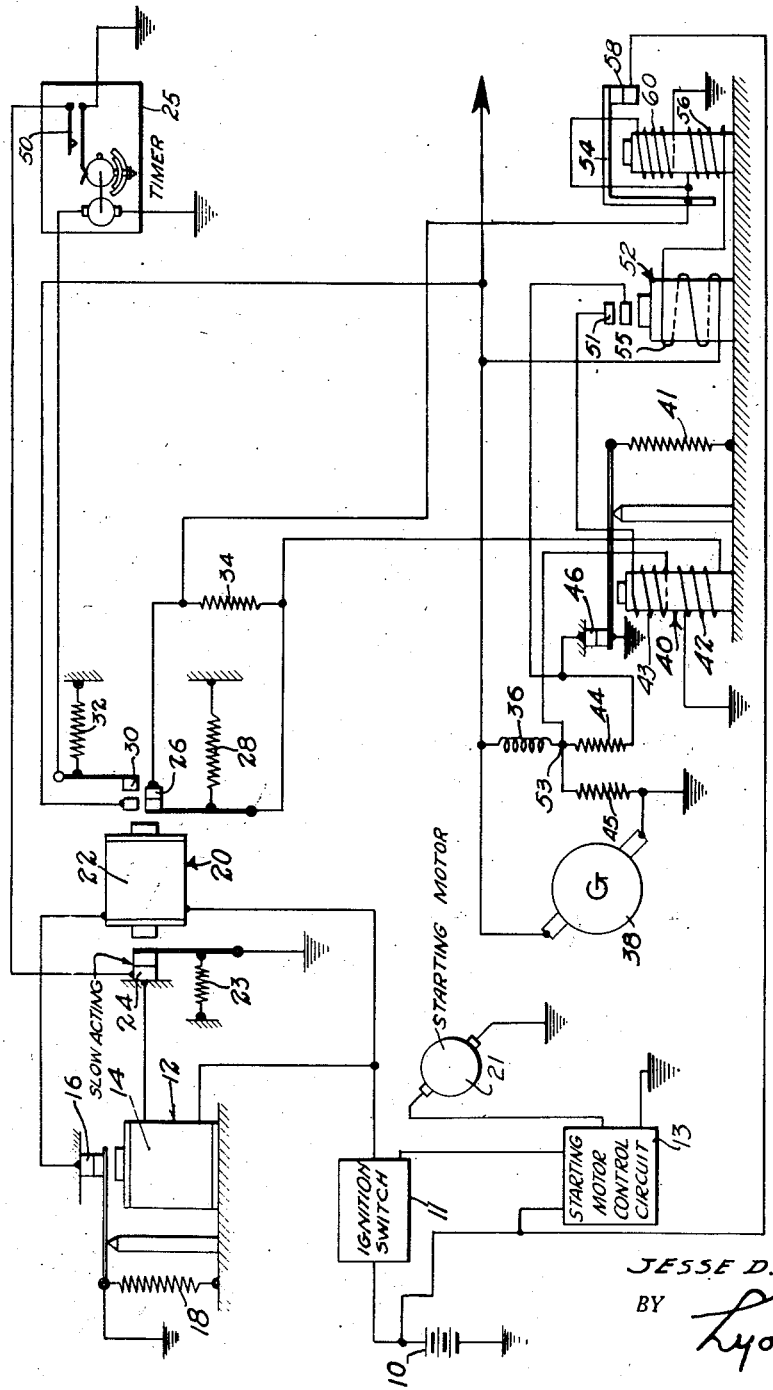
INVENTOR.
JESSE D. STAGGS
BY
Lyon & Lyon
ATTORNEYS

United States Patent Office

2,802,164
Patented Aug. 6, 1957

2,802,164

BATTERY-CHARGING APPARATUS

Jesse D. Staggs, Burbank, Calif.

Application June 28, 1954, Serial No. 439,759

5 Claims. (Cl. 320—12)

This invention relates to battery-charging apparatus and, more particularly, to an improvement in such apparatus. Vehicles having gasoline engines, such as automobiles, employ batteries for starting, ignition, etc., which are maintained charged by a generator. The present preferred arrangement is to use a shunt field type of charging generator with voltage and current regulating relays each operating to control the voltage and current output from the generator by periodically shorting out a resistor in series with the shunt field. The voltage regulator is set to maintain the generator voltage at a desired charging value. The current regulator limits the charging current to a desired value. A cutout switch performs the operation of disconnecting the generator from the battery when the battery voltage exceeds that of the generator and serves to connect the generator to charge the batery when the generator voltage exceeds that of the battery. This apparatus is well known and may be found described in any text on the electrical system of an automobile.

One of the characteristics of the battery carried in the modern vehicles is that the no-load or very light-load output voltage of the battery is not too good an indicator of the condition of the charge of the battery. A true indication of the state of charge of the battery can only be reliably determined when the battery is subjected to a heavy load. Such a load occurs when the battery is used for starting the engine, for example. Accordingly, when a car is started, a heavy load is applied to the battery for a short period of time. As soon as the engine starts, the only load on the battery for the usual daylight travel is the ignition system. This is an extremely light load, and, although the battery may not be as fully charged as it should be, its voltage will be such as to prevent adequate battery charging after a short time. Thus, although the battery actually requires more of a charge to better supply current for the next required starting load, it does not receive it. Over a period of time, the battery will run down because of this charging failure, in view of the battery no-load or light-load characteristic, even though it is connected to a charging generator and to a system which measures its output voltage. Thus, the battery approaches a time when it no longer can provide the energy required to start an engine, and it must receive an auxiliary charge outside of the charge provided from the generator in the vehicle.

An object of the present invention is to provide a system which prevents battery rundown occurring in the above-described manner.

Another object of the present invention is to provide a novel and inexpensive auxiliary voltage-regulation apparatus which supplements that already existing in a vehicle and assists in preventing battery rundown.

Still a further object of this invention is to provide novel, auxiliary voltage-regulation apparatus which insures that a battery is maintained properly charged.

These and other objects of the invention are achieved in a system wherein means are provided to test battery voltage under load conditions. These means are responsive to the battery voltage under load dropping below a predetermined minimum to actuate other apparatus which increases the output voltage of the generator for a predetermined time, regardless of the voltage of the battery after the load is removed. Since, in the charging system in which this invention finds its greatest utility, the battery is charged from a generator through apparatus which allows the generator to charge the battery when its voltage exceeds that of the battery and disconnects the generator from the battery when the battery voltage exceeds that of the generator, this invention, by permitting an increase in the generator output voltage, insures that the battery is charged for the predetermined interval. Thus, the occurrence of battery rundown due to its not being sufficiently charged is eliminated.

The novel features that are considered characteristic of this invention are set forth with particularity in the appended claims. The invention, itself, both as to its organization and method of operation, as well as additional objects and advantages thereof, will best be understood from the following description when read in connection with the accompanying drawing, which is a schematic diagram of an embodiment of the invention.

As previously stated, in the usual vehicular electrical system, a battery is charged from a generator which has its voltage regulated and its output current limited. A cutout switch functions on reverse currents, that is, when the generator voltage exceeds that of the battery, current flows through the cutout switch coil in a direction to close it, thus permitting the generator to charge the battery. The presently preferred generator for utilization in vehicles is the type which has a shunt field, so that the current flowing in the field can be varied to control the output voltage of the generator. The presently preferred method of control is to use a relay having its coil connected across the generator output which rapidly inserts and shorts out a resistance in series with the shunt field. The voltage at which the relay inserts the resistance is set slightly above the voltage at which it is shorted out. Accordingly, when the generator output reaches the higher voltage the resistance is inserted, thus dropping the voltage, whereupon the relay inserts the resistance again. Thus the generator output voltage is regulated about the value at which the relay inserts and shorts out the resistor. Increasing the upper voltage at which the relay operates increases the generator-regulated output voltage. Decreasing the upper voltage at which the relay operates has the opposite effect. This system may be found described, for example, in Electrical Contacts Data Book, published by P. R. Mallory & Co., Inc., December 1945, chapter 6.

The present invention co-operates with the presently known and used charging system in order to insure that a battery is properly charged at all times, so that it can handle the loads to which it is subjected without being run down.

Referring now to the drawing, the battery 10 is connected at one side to ground and on the other side to the ignition switch 11 of the vehicle. From the ignition switch, connection is made to a first relay 12 and a second relay 20. Connection is also made to the starting motor control circuit 13, which may now be energized to permit current to flow to the starting motor 21 until such time as the engine of the car is started. At this time, the starting motor control circuit interrupts the flow of current to the starting motor. Such control circuits are well known in the art, and a suitable one is shown and described, for example, on pages 242 through 246 of the book by R. J. Everest, entitled Motor Tuneup Manual, and published by the McMillan Company in 1949. The first relay 12 has a coil 14 and a set of contacts 16 which are biased closed by a spring 18. The second relay has a coil 22, a first set of contacts 24 which are biased closed in the inoperative condition by a spring 23, a set of contacts 26 which are biased closed by a spring 28 in the inoperative condition, and a set of contacts 30 which are biased open by a spring 32 in the inoperative condition. Relay coil 14 is connected across the battery 10 through closed contacts 24 when the battery voltage is sufficiently high because when the battery voltage is sufficiently high, contacts 16 will open before coil 22 can open contacts 24, which contacts 24 are slow acting, as will hereinafter appear. Contacts 16 are kept open by virtue of the current flowing through the relay coil 14. Relay coil 22 makes connection with the other side of the battery through contact 16 and, therefore, as long as these contacts are open, relay coil 22 is inoperative. When, for example, a car is started, the usual starting load, such as a starting motor 21, is connected across the battery and reduces the voltage to an extent determined by the state of charge of the battery. If the state of charge is low, this voltage will drop to a low value. If the state of charge of the battery is good, the value to which its output voltage under load drops is not so low.

The bias of spring 18 can be adjusted so that if the battery voltage under load drops below a predetermined value the excitation through the coil 14 is insufficient to hold open contacts 16 against the pull of spring 18. These then close, thus applying current to the relay coil 22. Upon being excited, it operates to close contacts 30 and open contacts 24 and 26. The contacts 24 are made slow-acting, so that when the ignition key is first turned on, the voltage which is applied simultaneously to coils 14 and 22 will enable coil 14 to operate and pull open contacts 16, if the battery voltage under load of the starting motor is sufficiently high to effectively energize coil 14, before coil 22 has a chance to open contacts 24 if, due to a low state of battery charge, the battery voltage under the load imposed upon it by the starting motor is too low to cause coil 14 to open contacts 16, then relay coil 22, which is operative in any battery voltage which will normally occur, will operate to open contact 24 after a time delay, and therefore relay coil 14 cannot be further energized, nor can contact 16 again be opened to cause the energization of relay coil 22 unless or until contacts 24 have been shunted by timer operated contacts 50, as will hereinafter be described.

A timer 25, which may be any suitable commercial type, is provided which is connected to the generator through contacts 30. The timer may consist, for example, of a motor which drives a cam wheel. After a predetermined interval, the wheel cam closes the contacts 50. The interval from start to contact operation is adjusted by an adjustable stop to which the cam wheel is returned by a spring (not shown), when power to the timer is interrupted. The timer, if desired, may be a suitable thermocouple device instead. Upon operation of the coil 22, contacts 30 are closed, thus initiating the timing cycle when the generator provides sufficient output. It will be noted that contacts 24 are opened after a time delay when coil 22 is operated, thus preventing coil 14 from interrupting the timing cycle by opening contacts 16 again and thus rendering relay 20 inoperative. Contacts 26 are also opened when relay coil 22 is excited. Contacts 26 are connected in shunt with a resistor 34, which is connected in series with the coil 42 of a conventional voltage-regulator relay 40. Voltage-regulator relay 40 has two separate coils, a lower coil 42 and an upper coil 43. The lower coil 42 comprises the voltage winding of the relay and has one end connected to ground and the other end connected both to the contacts 26 of relay 20 and to one end of resistor 34. Upper coil 43 comprises the current winding of the relay and has one end connected to the upper one of contacts 51 of current regulator relay 52 and the other end connected to a junction point 53. To this junction point 53 are also connected the generator field coil 36, the resistor 44, and the resistor 45. Resistor 45 has its other end grounded. Resistor 44 has its other end connected to the upper one of contacts 46 and the lower one of contacts 51. The lower one of contacts 46 is connected to ground.

The single coil 55 of relay 52 has one end connected to one armature terminal of the generator 38 and to the field winding 36. The other end of the coil 55 is connected to one end of the current winding 56 of the cutout relay 54. The other end of the current winding 56 is connected to the other side of resistor 34 and to the contacts 26, and also to the upper one of the contacts 58 of relay 54. Connection is also made to the one end of the voltage coil 60 of cutout relay 54. The other end of the coil 60 is connected to ground.

At this point it should be noted that the two relays 40 and 52 are of the "normally closed" contact type. That is, they have a spring bias to keep their contacts closed in the absence of any current exciting the windings of the relays. This spring bias is shown in detail for relay 46, but is not shown for relays 52. Relay 54 is of the "normally open" type and its spring bias is not shown. This regulator, with the exception of the modification by connections to resistor 34 and contacts 26 is shown and described in detail on page 82 and Figure 45 of the text "Voltage Regulator Manual," by Everest, which is published by the MacMillan Co., New York, 1951. The figure in that text shows a direct connection between the lower end of coil 42 and the upper end of coil 56. Thus, the sole modification in a voltage regulator provided by this invention is the connections to insert resistor 34 in series with the voltage winding 42 of relay 40, and the connections to contacts 26 of relay 20 whereby the resistor 34 is shorted out so that the regulator operation at that time is as if the resistor is not in the circuit.

In the usual operation of the relays for regulating voltage (which can be considered as occurring when contacts 26 are closed, as shown) either the voltage regulator relay 40 or the current regulator relay 52 functions, but not both at once. Both these relay contacts must be closed for the generator to have a complete field circuit and to start generating current. At that time the field current flows through the field winding 36, junction point 53, the current coil 43 of the relay 40, contacts 51 of relay 52, and through contacts 46 of relay 40 to ground. The current through the coil 43 at this time is not strong enough to operate the voltage-regulator relay 40.

When the voltage of the battery is too low to operate the voltage relay 40, although the engine speed is great enough to obtain maximum generator output, the current relay 52 will function. At this time, voltage and cutout relays remain closed. Current flows from the generator through the current relay coil 55, through the coil 56 and contacts 58 of relay 54, through the battery 10 to ground. As the current output reaches a predetermined value, it causes the current relay to vibrate. When the current relay contacts 51 are closed (the drawing shows these contacts in the operated position), the upper coil 43 of the voltage-regulator relay is placed in shunt with resistors 45 and 44. Opening of the current-regulator relay contacts (as shown) removes this upper coil. This upper coil is a current impedance, and inserting it into and out of the field circuit is used for current regulation. It is inserted into the circuit when it is desired to increase current to the field and is withdrawn by the current-control relay when the field current is too high. The resistors 44, 45 at this time are always connected together and across the current regulator relay contacts. Their combined resistance is low because current control does not require as high a resistance across the contacts as does the voltage relay.

When the battery is sufficiently charged to create a high resistance in the charging circuit which will cause the voltage to rise because of the generator forcing current into the battery, the current flowing is insufficient to operate the current relay; therefore, its contacts will remain closed. Because of the buildup of voltage, however, the current flowing through the voltage winding 42, which effectively is connected across the battery 10 through closed contacts 26, and closed contacts 58, is increased to the point where the voltage-regulator relay contacts 46 are operated and vibrate. When these contacts 46 open, only resistor 45 is connected in series with the field coil 36, thereby decreasing the current through the field coil. When the voltage regulator contacts close, two resistors 44 and 45 in shunt with each other are connected in series with the field coil, whereby the current through it increases. Regulation of the generator voltage output is thus controlled by the voltage regulator as long as the generator-current output remains below a predetermined minimum.

The voltage coil 60 of the cutout relay is connected across the generator and operates the cutout relay contacts 58 to connect the generator to the battery when the generator voltage is sufficiently high to charge the battery. The current coil 56 on the cutout relay contacts 58 will operate the relay to disconnect the generator from the battery when current flows from the battery toward the generator which can occur at low engine speeds.

The above-described operation is the usual one of a voltage and current regulator. Now consider the change made in the usual mode of operation arising as a result of the insertion of resistor 34 in series with the voltage coil 42. As previously stated, voltage-regulator relay 40 operates to take out or put in resistor 44 in series with the field coil 36 of generator 38. Resistor 44 is connected in shunt with contacts 46 of voltage-regulator relay 40. The relay operates at a predetermined voltage determined usually by adjusting the spring 41. Inserting resistor 34 in series with the coil of the voltage-regulator relay prevents its operation at the predetermined voltage but requires a higher voltage before the coil provides enough force to overcome the pull of the spring 41. Thus the voltage about which the regulator relay operates is higher by an amount determinable by the value of the resistor 34. Thus the generator will keep charging the battery at a higher voltage for the period determined by the timer. The current regulator 52 and cutout relay 54 still function as before to prevent too heavy a charging current, and thus the battery is protected.

The timer has its cycle initiated by closing contacts 30. For a predetermined time, contacts 26 are kept open. At the end of that time, the timer momentarily closes contacts 50 which are in shunt with contacts 24. The battery circuit to relay coil 14 is thus closed again and the relay is then operated to pull open contacts 16. This serves to inactivate relay 20. The timer resets when contacts 30 open and resistor 34 is again shorted out by contacts 26.

The period of charging the battery which is timed by the timer may be set for an interval which is found suitable, as determined by the type of battery employed. This may be on the order of one hour, for example. The value of the resistor 34 may be determined by the value of generator voltage which it is desired to employ for charging the battery. This may be set at a value, for example, of 7.5 volts for a three-cell battery. At the end of the charging cycle, the auxiliary voltage-regulator apparatus comprising the present invention is inactivated. Thereafter, the battery 10, if its no-load voltage exceeds that set by means of spring 41, will continue to be charged in the usual manner by the usual charging system of the vehicle. The apparatus of the present invention is called into operation only when the condition of the battery reaches such a value as to make the pull of relay coil 14 ineffective to maintain contacts 16 open. This low value may also occur when the condition of the battery is so run down at no-load that its voltage is less than the preset value. It will be appreciated, however, that the present embodiment of the invention described tests the battery under the conditions at which a true determination of its state of charge may be made, namely, load conditions, and then insures that the battery is charged, thus functioning to maintain the battery in its best condition to meet full-load applications thereto.

Accordingly, there has been described herein novel and useful apparatus which may be employed to augment the normal regulating apparatus in a vehicle for the purpose of maintaining a battery in the best condition to meet the load demands thereon. Although the present apparatus has been described in connection with a vehicular voltage-regulation system, it will be appreciated that this has been done for the purposes of explaining the embodiment of the invention and is not to be construed as a limitation thereon.

I claim:

1. In a battery-charging system of the type wherein a battery is automatically charged from a preset voltage-regulated generator when the battery voltage is less than the preset voltage of said generator, auxiliary battery-charge regulating apparatus comprising means operative responsive to the voltage value of said battery under load being less than a predetermined value, means responsive to operation of said operative means to effectuate an increase in the regulated voltage of said generator over its preset value for a predetermined time interval and to render said means operative responsive to said battery voltage value inoperative during said time interval.

2. In a battery-charging system of the type wherein a battery is automatically charged from a preset voltage-regulated generator when the battery voltage is less than the preset voltage value of said generator, auxiliary battery-charge regulating apparatus comprising a relay having its coil connected across said battery and a set of contacts which are opened when said coil is excited by said battery, means to urge said contacts closed when the voltage across said battery is less than a desired value under load conditions, means to disconnect said relay coil from said battery and to effectuate an increase in the voltage output of said generator over said preset value responsive to said contacts being closed, and a timer operative responsive to said means to disconnect becoming operative to connect said relay coil to said battery at the end of a predetermined interval.

3. In a battery-charging system of the type wherein a battery is automatically charged from a generator when the battery voltage is less than the voltage of said generator, said generator voltage being regulated at a preset value by a voltage-regulator relay having a coil auxiliary battery-charge regulating apparatus comprising a first relay having its coil connected across said battery and a first set of contacts which are opened when said first relay coil is excited by said battery, means to urge said contacts closed when the voltage across said battery is less than a desired value under load conditions, a resistor connected in series with the coil of said voltage-regulator relay effective to increase the value of voltage required to operate said voltage regulator relay, a second relay operative responsive to closing of said first contacts to disconnect said first relay coil from said battery, said second relay having a pair of contacts connected across said resistor which normally are closed and are opened when said second relay is made operative, and a timer operative responsive to said second relay being made operative to connect said first relay coil to said battery again at the end of a predetermined interval.

4. In a battery-charging system of the type wherein a battery is automatically charged from a generator when the battery voltage is less than the voltage of said generator, said generator voltage being regulated at a preset value by a voltage-regulator relay having a coil, auxiliary battery-charge regulating apparatus comprising a first relay having its coil connected across said battery and a first set of contacts which are open when said first relay coil is excited by said battery, means to urge said contacts closed when the voltage across said battery is less than a desired value under load conditions, a resistor, means connecting said resistor in series with the coil of said voltage-regulator relay, a second relay operative responsive to closing of said first relay contacts, said second relay including means responsive to operation of said second relay to disconnect said first relay from said battery and means operative to short out said resistor only when said second relay is inoperative, a timer operative for a given interval responsive to said second relay being made operative, and means responsive to said timer attaining the end of said given interval to connect said first relay to said battery again.

5. In a battery-charging system of the type wherein a battery is automatically charged from a generator when the battery voltage is less than the voltage of said generator, said generator voltage being regulated at a preset value by a voltage-regulator relay having a coil, auxiliary battery-charge regulating apparatus comprising a first relay having its coil connected across said battery and a first set of contacts which are open when said first relay coil is excited by said battery, means to urge said contacts closed when the voltage across said battery is less than a desired value under load conditions, a resistor, means connecting said resistor in series with the coil of said voltage-regulator relay, a second relay operative responsive to closing of said first relay contacts, said second relay having a first set of normally closed contacts, a second set of normally closed contacts, and a third set of normally open contacts, said first set of contacts connecting said first relay to said battery, said second set of contacts being connected in shunt with said resistor, a timer, means to apply operative potential to said timer through said third set of contacts, and means responsive to said timer operating over a given interval to connect said first relay coil to said battery again.

References Cited in the file of this patent

UNITED STATES PATENTS

| | | |
|---|---|---|
| 2,038,195 | Pilkington | April 21, 1936 |
| 2,136,716 | Toelle | Nov. 15, 1938 |
| 2,157,661 | Fitzgerald | May 9, 1939 |

OTHER REFERENCES

"Voltage Regulator Manual," Everest, p. 82, Fig. 45, published by MacMillan Co., N. Y., 1951.

"Electrical Contacts Data Book," P. R. Mallory Co., Inc., December 1945, chapter 6.

"Motor Tuneup Manual," by R. J. Everest, published by MacMillan Co., in 1949, pages 242 to 246.